United States Patent
Anderson et al.

(10) Patent No.: US 8,473,689 B2
(45) Date of Patent: Jun. 25, 2013

(54) PREDICTIVE SEQUENTIAL PREFETCHING FOR DATA CACHING

(75) Inventors: Timothy D. Anderson, Dallas, TX (US); Kai Chirca, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 353 days.

(21) Appl. No.: 12/843,980

(22) Filed: Jul. 27, 2010

(65) Prior Publication Data
US 2012/0030431 A1 Feb. 2, 2012

(51) Int. Cl.
*G06F 12/00* (2006.01)
(52) U.S. Cl.
USPC .......... 711/137; 711/146; 711/154; 711/156; 711/163; 711/204; 711/E12.004
(58) Field of Classification Search
USPC .................. 711/137, 146, 154, 156, 163, 204, 711/213, E12.004
See application file for complete search history.

(56) References Cited

U.S. PATENT DOCUMENTS

2006/0053256 A1* 3/2006 Moyer et al. .................. 711/137
2011/0264864 A1* 10/2011 Kadambi et al. .............. 711/137

* cited by examiner

*Primary Examiner* — Midys Rojas
(74) *Attorney, Agent, or Firm* — Robert D. Marshall, Jr.; Wade James Brady, III; Frederick J. Telecky, Jr.

(57) ABSTRACT

A system for prefetching memory in caching systems includes a processor that generates requests for data. A cache of a first level stores memory lines retrieved from a lower level memory in response to references to addresses generated by the processor's requests for data. A prefetch buffer is used to prefetch an adjacent memory line from the lower level memory in response to a request for data. The adjacent memory line is a memory line that is adjacent to a first memory line that is associated with an address of the request for data. An indication that a memory line associated with an address associated with the requested data has been prefetched is stored. A prefetched memory line is transferred to the cache of the first level in response to the stored indication that a memory line associated with an address associated with the requested data has been prefetched.

8 Claims, 8 Drawing Sheets

US 8,473,689 B2

PREDICTIVE SEQUENTIAL PREFETCHING FOR DATA CACHING

BACKGROUND

Processors often use caches and other memory local to the processor to store data during execution. The processors more efficiently execute instructions when, for example, data accessed by a processor is stored locally in a cache. For this reason, an improvement in techniques for lowering latency requirements when referenced data is not stored or retained in a cache is desirable.

SUMMARY

The problems noted above are solved in large part by proactively predicting and prefetching the next cache miss data as disclosed herein. An illustrative embodiment comprises a system for prefetching memory in caching systems includes a processor that generates requests for data. A cache of a first level stores memory lines retrieved from a lower level memory in response to references to addresses generated by the processor's requests for data. A prefetch buffer is used to prefetch an adjacent memory line from the lower level memory in response to a request for data. The adjacent memory line is a memory line that is adjacent to a first memory line that is associated with an address of the request for data. An indication that a memory line associated with an address associated with the requested data has been prefetched is stored. A prefetched memory line is transferred to the cache of the first level in response to the stored indication that a memory line associated with an address associated with the requested data has been prefetched.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection may be through a direct electrical connection, or through an indirect electrical connection via other devices and connections.

Processor ("CPU") cache performance can be determined by measuring reactive demand miss latency. Disclosed herein are techniques for improving the cache performance by proactively predicting and prefetching data that would otherwise produce a cache miss when accessed by the CPU. Various embodiments for cache prefetching may include prefetching algorithms implemented using hardware without software support or using hardware having various degrees of software support.

Figure 1:
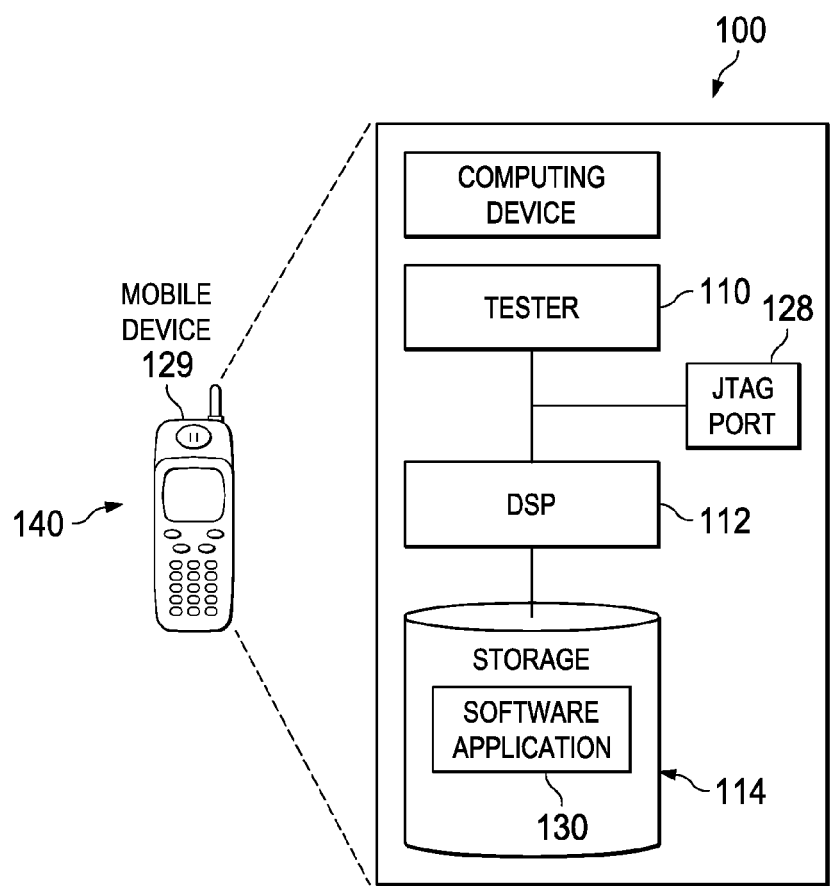
FIG. 1 shows an illustrative computing device 100 in accordance with embodiments of the disclosure.

FIG. 1 shows an illustrative computing device 100 in accordance with embodiments of the disclosure. The computing device 100 may be, or may be incorporated into, a mobile communication device 129, such as a mobile phone, a personal digital assistant (e.g., a BLACKBERRY® device), a personal computer, or any other type of electronic system.

In some embodiments, the computing device 100 comprises a megacell or a system-on-chip (SoC) which includes control logic such as a digital signal processor (DSP) 112, a storage 114 (e.g., random access memory (RAM)) and tester 110. The storage 114 stores one or more software applications 130 (e.g., embedded applications) that, when executed by the DSP 112, perform any suitable function associated with the computing device 100. The tester 110 comprises logic that supports testing and debugging of the computing device 100 executing the software application 130. For example, the tester 110 may emulate a defective or unavailable component(s) of the computing device 100 so that a software developer may verify how the component(s), were it actually present on the computing device 100, would perform in various situations (e.g., how the component(s) would interact with the software application 130). In this way, the software application 130 may be debugged in an environment which resembles post-production operation.

Figure 2:
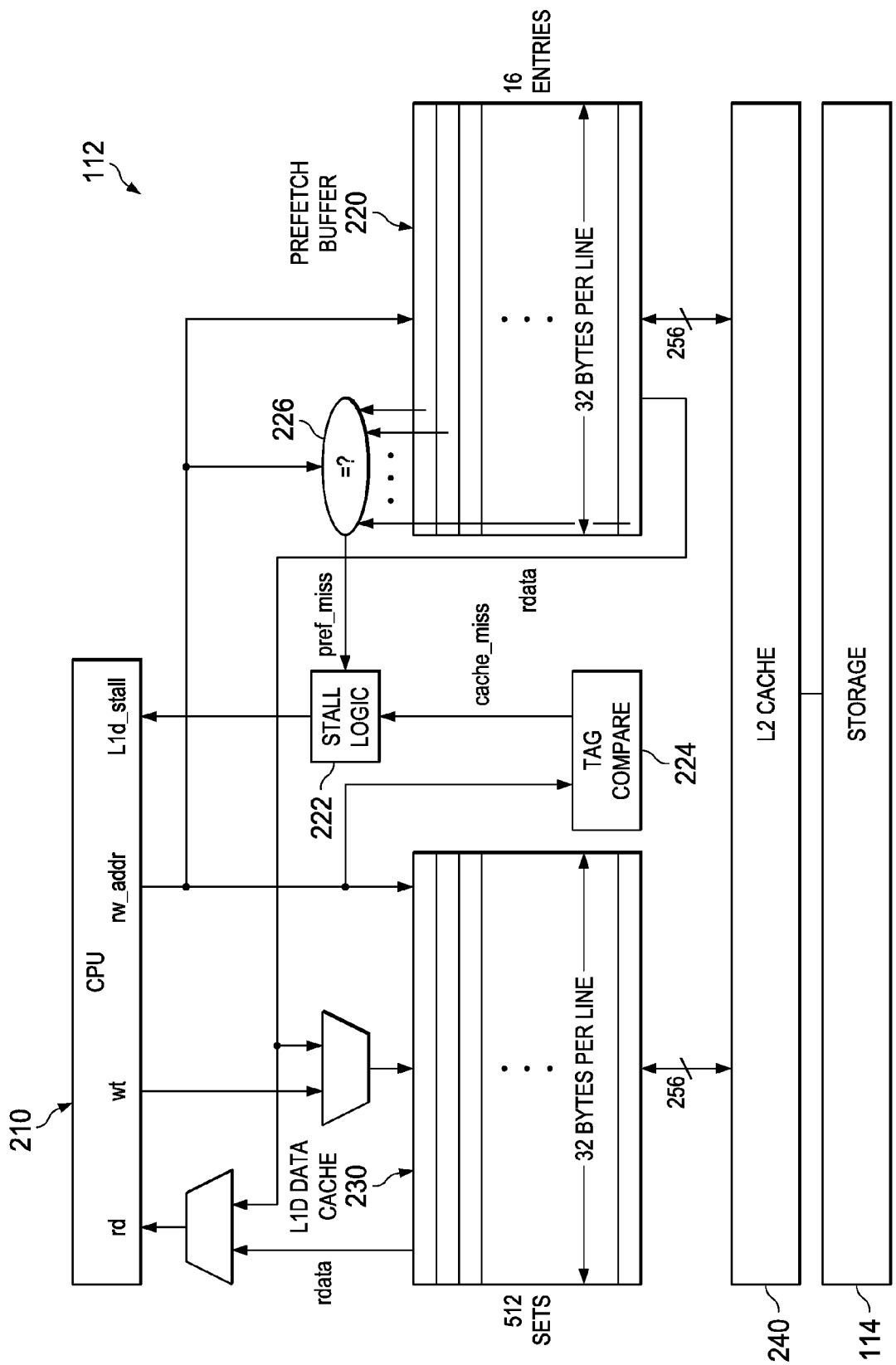
FIG. 2 is a block diagram illustrating a system for predictive sequential prefetching in accordance with embodiments of the disclosure.

The DSP 112 typically comprises multiple memory caches which store information frequently accessed from the storage 114, thereby increasing the execution speed of the software application 130. Accordingly, as shown in FIG. 2, the DSP 112 includes a CPU 210 which is coupled to a prefetch buffer 220, first-level data (L1D) cache 230 and a second-level (L2) cache 240 coupled to a memory (e.g., storage 114) that may be external to the DSP 112. As disclosed herein, the prefetch buffer 220 can be configured to quickly provide stored data as desired to either the CPU 210 or the L1D cache 230. The L1D cache 230 stores data, and the L2 cache 240 typically stores "unified" cache storing data, program instructions and/or other types of information. The L1D cache 230 is typically considered to be at a "higher" level than the L2 cache 240. Also, the L1D 230 and the L2 cache 240 are considered to be at higher levels than the storage 114. The L1D cache 230 is normally accessed more quickly than the L2 cache 240, which in turn is normally accessed more quickly by the CPU 210 than the storage 114. For example, the DSP 112 may have a processor speed of 600 MHz, the L1D cache 230 may have access speeds of 600 MHz, the L2 cache 240 may have an access speed of 300 MHz, and the storage 114 may have an access speed of about 100 MHz. The scope of disclosure is not limited to any particular architecture or number of CPUs or caches. Any number of CPUs and/or caches may be used. In multi-CPU systems, multiple CPUs may collect data from and distribute data to corresponding and/or shared caches, buffers, registers, memories, and the like.

If the CPU 210 executes code which requires data stored at a particular address in memory, the CPU 210 may first determine whether the L1D cache 230 stores data associated with the particular address. If the address is found in the cache (a cache "hit"), the CPU 210 retrieves the data from the L1D cache 230 at that address. If the L1D cache 230 has not stored the data associated with the particular address (a cache "miss"), a next-fastest cache (such as the L2 cache 240) may be consulted to determine whether the next-fastest cache (and so on) contains the data associated with the particular address. If the reference for the address matches a tag (or "hits") in the L2 cache 240, the CPU 210 retrieves the addressed data in the L2 cache 240 at the particular address. If the reference misses in the L2 cache 240, the CPU 210 may obtain the data from memory (such as storage 114) external to the DSP 112. In various embodiments, a cache miss may cause the addressed data to be brought into the cache so that the information will be available the next time the CPU 210 tries to access the information.

Figure 3:
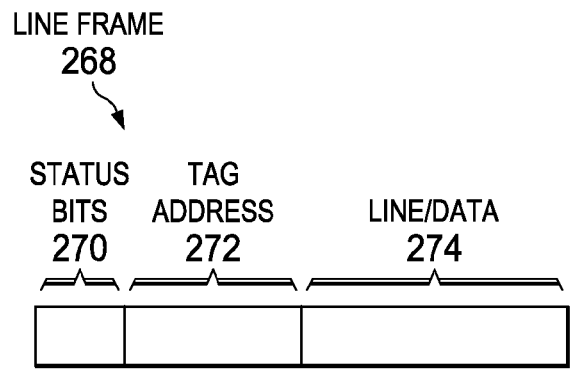
FIG. 3 is a block diagram illustrating a line frame in accordance with embodiments of the disclosure.

At least some caches in the DSP 112 include a plurality of line frames, which may be used to store data and/or instructions (collectively referred to herein as "data"). As shown in FIG. 3, a line frame 268 is a data structure that stores a predetermined amount of data 274 in addition to status bits 270 and a tag address 272 associated with the data. In at least some embodiments, a line frame may store approximately 32 bytes of data known as a "line." In other embodiments, an amount of data 274 stored per line frame 268 in one cache may differ from an amount of data stored per line frame in another cache. In some embodiments, the status bits 270 indicate whether the line 274 in a line frame 268 is valid, and if valid, whether the line 274 is "dirty." A line is considered to be "dirty" when the line has been updated with a data value which has not been used to update a corresponding line in a lower level memory. For example, if a line in an L1 cache is updated but a corresponding line in the L2 cache is not updated with the same value, the L1 cache line is dirty. The scope of disclosure is not limited to including any particular information in each line or line frame. The information contained in a line frame may be the same as, different than, similar to, less than or greater than that which is specifically disclosed herein.

Each line in a cache is associated with a different address. An illustrative 32-bit address comprises a tag address (e.g., bits 31:14) such as tag address 272, a set address (e.g., bits 13:5) and an offset or NULL value (e.g., bits 4:0). Lines (and associated line frames) having a common set address are often mapped into a group known as a "set." Because lines within a set share a common set address, the lines within the set are distinguished from one another using the tag address of each line. Thus, if the CPU 210 is accessing cache data stored at a particular 32-bit address, the CPU 210 uses the set address in bits 13:5 to locate a matching set in the cache, and also uses the tag address in bits 31:14 to locate a matching line within the set.

In accordance with preferred embodiments of the invention, each cache also has a specific number of "ways." A collection of corresponding line frames across all sets in a cache is called a "way" in the cache. The number of ways in a cache also corresponds to the number of line frames present in each set of the cache. For instance, a two-way cache has two ways, and each set in the cache has two line frames associated with that set, where each of the two line frames is associated with one of the two ways. As a result, data to be allocated to a particular set has two possible line frame destinations.

In some embodiments, each cache stores various kinds of information that pertain to the line frames in that cache. For example, the line frames in a set may be ranked or ordered based on how recently each line frame was accessed. In an illustrative set comprising five line frames, the most recently accessed line frame (e.g., accessed for a data read or write) may be ranked first, and the least recently accessed line frame may be ranked last. Alternatively, the least recently accessed line frame may be ranked first, and the most recently accessed line frame may be ranked last. Such rankings may be termed "least recently used" (LRU) rankings. In operation, when new data is to be stored in a set, the LRU rankings may be used to determine which line frame was least recently accessed. The data in the line frame which was least recently accessed may be removed, or "evicted," to make room for the new data to be stored in that line frame.

Although the scope of disclosure is not limited to any particular number or type of cache, LRU rankings may be used to evict data from the cache in the context of set-associative caches. More specifically, a set-associative cache contains multiple line frames per set within which data from each lower-level memory location may be held. For example, in a two-way set associative cache, data from a single memory location in the L2 cache 240 may be stored in two locations in the L1D cache 230. Thus, when determining in which of the two locations in the L1D cache 230 to store a data value from the L2 cache 240, an LRU ranking of the two locations may be compared. Data in the location that is least-recently accessed is typically evicted to make room for the data value from the L2 cache 240. Other types of caches also may be used, such as direct-mapped caches and fully-associative caches. A direct-mapped cache comprises a single line frame per set within which data from a lower-level memory location may be held. A fully-associative cache enables the storage of a lower-level memory location into any line frame of the fully-associative cache.

Figure 4:
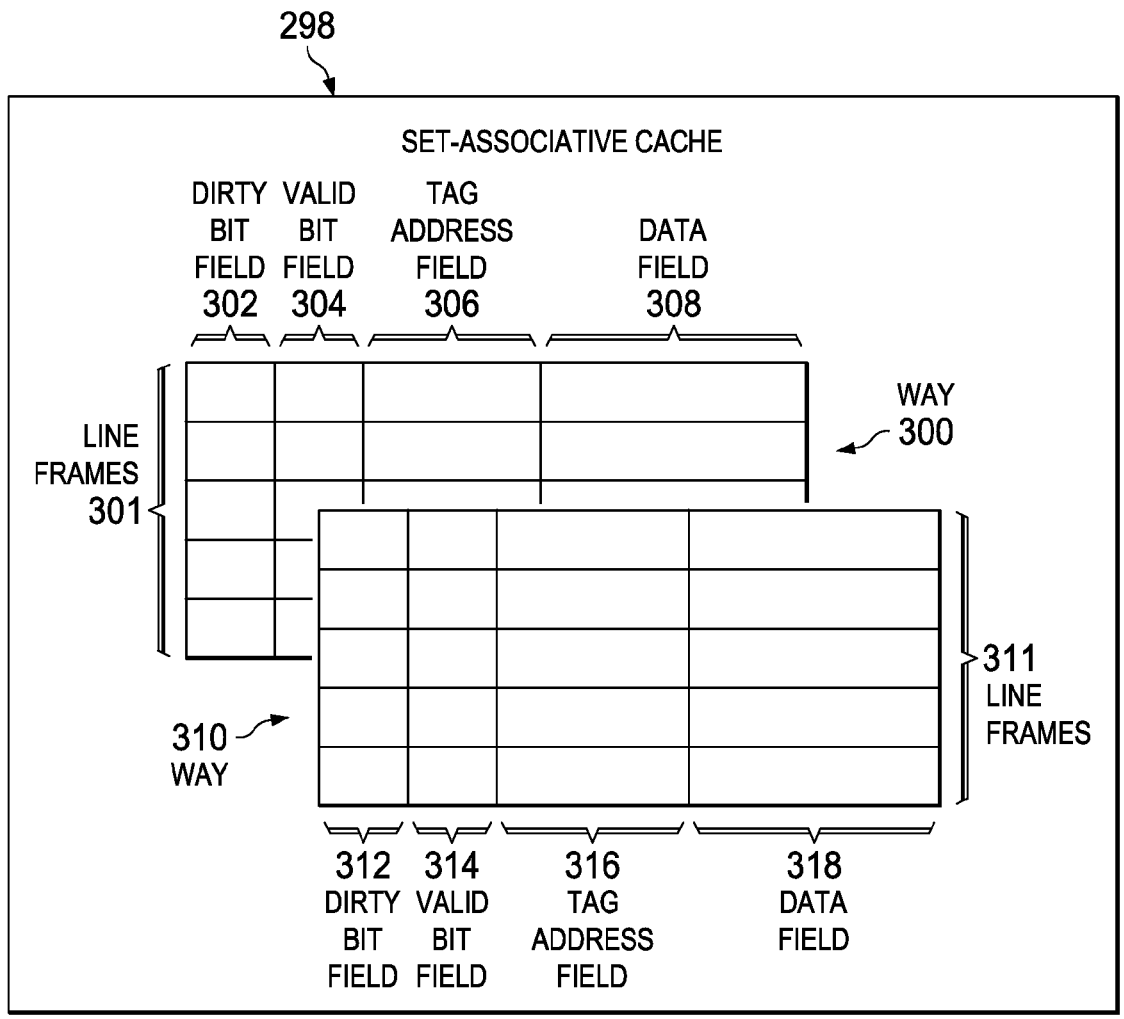
FIG. 4 is a block diagram illustrating a set-associative cache in accordance with embodiments of the disclosure.

FIG. 4 shows a more detailed view of a set-associative cache 298. The cache 298 is illustrative of a first-level cache (e.g., L1D cache 230), but the cache 298 also may be representative of the L2 cache 240. The cache 298 comprises ways 300 and 310. Way 300 comprises line frames 301, and way 310 comprises line frames 311. Although ways 300 and 310 are shown comprising line frames, alternate representations may show sets as comprising line frames. Each line frame 301 comprises a dirty bit field 302, a valid bit field 304, a tag address field 306, and a data field (e.g., "line") 308. Likewise, each of the line frames 311 comprises a dirty bit field 312, a valid bit field 314, a tag address field 316, and a data field (e.g., "line") 318. In operation, the DSP CPU 210 searches the cache 298 to locate a line having a target address being referenced. The CPU 210 first locates a set in the cache which matches bits 13:5 (e.g., the set address) of the target address. When a matching set is found in the cache 298, the CPU 210 further locates a line frame in the matching set having a tag address field that matches bits 31:14 (e.g., the tag address) of the target address. If a matching line frame is found, the CPU 210 then determines whether the line (e.g., the data) in the line frame is valid by checking the valid bit field of the matching line frame. If the valid bit field indicates that the line in that line frame is valid, the CPU 210 accesses the data and uses the access data as programmed.

If a matching line frame is not found in the cache 298, space in the cache 298 is allocated to provide space in the cache in which the requested from a lower-level cache or memory can be stored. To allocate space in the cache 298, the LRU rankings may be checked to determine which line frame is least recently used, and the LRU line frame is typically evicted. However, before the LRU line frame is evicted, the dirty bit of the line frame in question may be checked to determine whether a lower level of memory/cache contains data associated with the LRU line frame. If the LRU line frame is dirty (which indicates that a lower level memory/cache does not necessarily contain the data associated with the LRU line frame) the data in the LRU line frame is first transferred to a lower-level memory/cache, and then the LRU line frame is evicted from the cache 298 to allocate space.

CPU cache fetching typically involves fetching a requested line from main memory into a CPU cache (such as a first-level data cache) when the CPU 210 references data that is stored within the requested line. CPU cache prefetching typically involves fetching a line of memory that has not yet been referenced, but there may be an expectation that the line may be referenced in the near future. Prefetching algorithms are typically concerned at least two issues: (1) which memory line should be prefetched to reduce compulsory misses in a cache, and (2) when to prefetch the memory line to minimize data traffic and power consumption encountered when accessing an L2 memory or other memory (e.g., storage 114).

Prefetching schemes (such as "always prefetch" and "prefetch on misses only") perform a prefetch of lines that precede or succeed lines of a requested line. The lines that precede or succeed lines of a requested line may be stored, for example, contiguously such that an end of one line may be adjacent in address space to the beginning of a following line. (An adjacent line can be a line having common upper-order memory address bits with a requested line, for example.) The prefetching may occur when data within a reference line is fetched (but wherein the reference line has not recently been referenced). For example, a line "i+1" (succeeding line) or "i−1" (preceding line) can be prefetched when line "i" is referenced. (Thus, prefetching can minimize relatively long latencies associated with L2 accesses when the prefetched line is stored in the L1D cache 230 or the prefetch buffer 220.) Unidirectional prefetching schemes typically only prefetch lines that either precede or succeed a referenced line but do not prefetch both the preceding and succeeding lines. (As discussed below, prefetching schemes typically do not prefetch both the preceding and succeeding lines, because memory resources are wasted when prefetched lines remain unaccessed by the CPU 210.)

Prefetching schemes may also include "threaded prefetching" and "bidirectional prefetching." In threaded prefetching, a cache line "i" has an associated list of pointers for recording threads accessed after the cache line "i" is referenced. (A thread can be considered to be a group of processor instructions that tends to access particular memory locations in a group of addresses.) When the cache line "i" is accessed again by the processor, the threads associated with line "i" can trigger a prefetch of lines associated with the recorded threads. Recording such threads is relatively expensive to implement in hardware and often results in limited memory bandwidth and also results in increased data-access latencies when prefetching using threading.

In bidirectional prefetching, a line "i+1" and line "i−1" is prefetched (in an L1 cache for example) when line "i" is referenced. In a bidirectional prefetching scheme, cached data in often only one of the directions (preceding or succeeding) is typically referenced by the CPU within a relatively short period. Thus, when cached data in both directions is not referenced by the CPU within a relatively short period, memory resources can be wasted.

While prefetch sequences of lines in both directions can be stored in a prefetch buffer, storing lines in both directions can reduce the number of lines that can be stored in the prefetch buffer (assuming the capacity of the buffer is relatively constant). Also, more cache "pollution" of a cache can result if the lines having prefetched preceding and succeeding sequences are stored in the cache. Thus, such prefetch mechanisms can significantly increase the number of cache misses in a higher-level cache (such as an L1 cache) or other local buffer and can also increase the number of memory accesses to a lower-level cache (such as an L2 cache). Disclosed herein are techniques for prefetching lines relatively quickly in a "right" direction (e.g., in a direction that is predicted to be likely correct) while minimizing accesses of data stored in lower-level caches.

Figure 5:
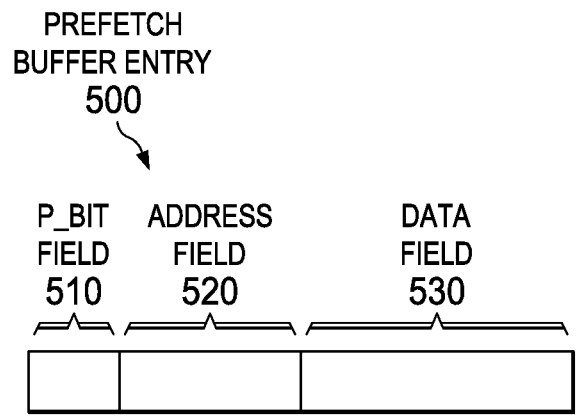
FIG. 5 is a block diagram illustrating a prefetch buffer entry in accordance with embodiments of the disclosure.

FIG. 5 shows an illustrative prefetch buffer entry 500 in accordance with embodiments of the disclosure. The prefetch buffer entry 500 may include fields such as a p_bit field 510, an address field 520, and a data field 530. P_bit field 510 may be used to store the status of whether an adjacent line of memory (that is contiguous, for example, with the memory line that is stored in the prefetch buffer entry 500) has been prefetched and stored within the prefetch buffer, for example. Thus, p_bit field 510 may be accessed to quickly determine whether a prefetch of the adjacent line of memory should be performed. The adjacent line of memory that is prefetched may be stored in a prefetch buffer or in a higher-level memory (such as a higher-level cache), such that the prefetched data is more-readily accessible, for example, to the CPU.

Address field 520 may be used to store the address (or part of the address, such as a memory tag) associated with the line of memory that is stored in data field 530 of the prefetch buffer entry 500. Data field 530 may be used to store the data of a memory line that is prefetched in accordance with the techniques disclosed herein.

Figure 6:
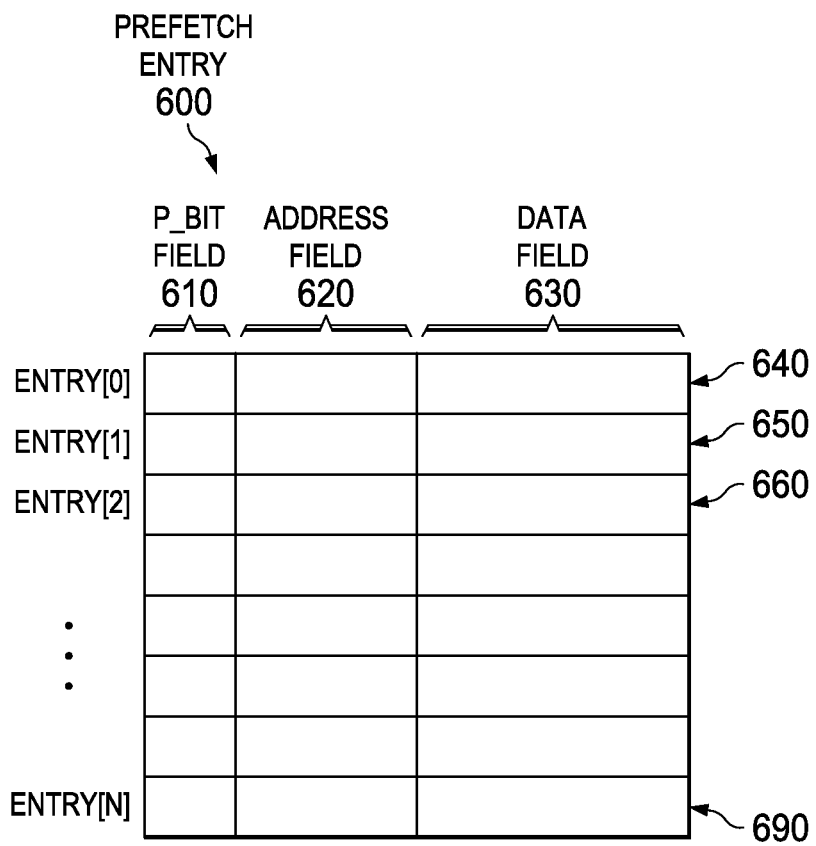
FIG. 6 is a block diagram illustrating a prefetch buffer in accordance with embodiments of the disclosure.

FIG. 6 shows an illustrative prefetch buffer 600 in accordance with embodiments of the disclosure. The prefetch buffer 600 may include entries (for example, entries 640, 650, 660, and 690), each entry of which may include fields such as a p_bit field 610, an address field 620, and a data field 630. The entries in the prefetch buffer 600 may be allocated to store memory lines that are implicated by a previous reference to an adjacent memory line (such as memory lines that are contiguous with a referenced memory line) for relatively quick access, should the implicated memory lines be subsequently referenced. The entries may be evicted to make room for new entries, for example, using an LRU (least recently used) policy and/or when a prefetched line is transferred into an L1 cache. The entries in the prefetch buffer 600 may be implemented, for example, in a cache memory (such as an L1 cache) and/or in dedicated standalone registers as shown in FIG. 2.

The P_bit field 610 of each entry may be used to store the status of whether, for example, a line of memory that is contiguous with the memory line that is stored in the prefetch buffer entry 600 is stored within the prefetch buffer, for example. The address field 620 may be used to store the address (or part of the address, such as a memory tag) associated with the line of memory that is stored in data field 630 of a given prefetch buffer entry. The data field 630 may be used to store the data of a memory line that is prefetched in accordance with the techniques disclosed herein.

Referring again to FIG. 2, the CPU 210 may be implemented using a C6x-type DSP processor. When the CPU 210 is operated without prefetching and whenever there is a cache miss, the CPU 100 typically halts (stalls) and waits for the required cache line to be filled. The L1D cache 230 may be organized having a cache size of 32 KB, having a line size of 64 bytes, and being two-way set-associative.

The prefetch buffer 220 may be organized as a fully-associative unidirectional prefetch buffer having, for example, 16 entries. To avoid cache pollution and minimize cache power consumption, the prefetch buffer 220 may be configured outside of the L1D cache 230. The prefetch buffer 220 may be implemented with each entry configured as a FIFO queue, with each entry being individually addressable. Entries in the prefetch buffer 220 may be allocated and evicted using an LRU (least recently used) policy.

In operation, tag compare 224 is used to determine whether LD1 cache 230 has cached a line referenced by the CPU 210. Likewise prefetch miss comparator 226 is used to determine whether the line referenced by the CPU 210 exists within the prefetch buffer 220. If the line referenced by the CPU 210 does not exist in the L1D cache 230 or the prefetch buffer 220, stall logic 222 stalls CPU 210 so that the line referenced by the CPU 210 may be retrieved, for example, from the L2 cache 240 or storage 114. If the line referenced by the CPU 210 exists in the L1D cache 230 or the prefetch buffer 220, the referenced line may be directly accessed by the CPU 210 without have a stall condition generated. The prefetch buffer 220 may be operated in various embodiments as described below.

Figure 7:
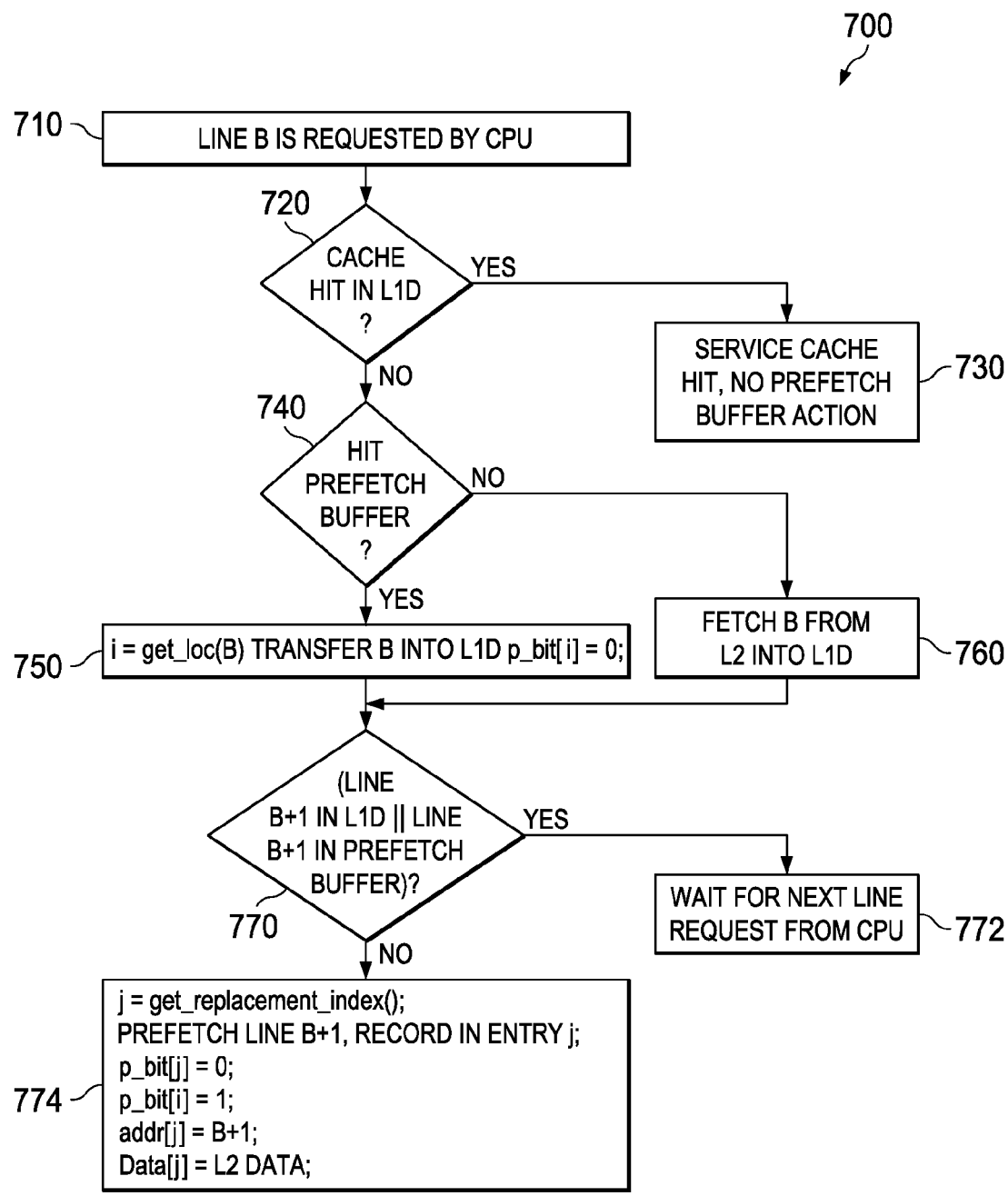
FIG. 7 is a flow diagram illustrating a method for unidirectional prefetch buffering in accordance with embodiments of the disclosure.

FIG. 7 shows an illustrative method 700 for unidirectional prefetch buffering that may be implemented in accordance with embodiments of the disclosure. (The methods herein are illustrated using flow diagrams for purposes of explanation: it can be appreciated that operations associated with various blocks in various diagrams can be, for example, executed at the same time and even in different orders than those illustrated.) In the illustrated embodiment, a "p_bit" is used to store an indication whether a line that is adjacent to a requested line has been prefetched. In some embodiments, the unidirectional prefetch buffer fetches data in a "forward" direction, such that (for example) a succeeding line that sequentially follows (and/or is contiguous with) a referenced line is prefetched. Other embodiments may include unidirectional prefetching in an opposite direction by which a preceding line is prefetched when a line that follows the preceding line is referenced.

The method 700 begins, for example, at block 710 with a line "B" from memory (including for example, the prefetch buffer 220, the L1D cache 230, the L2 cache 240, and/or storage 114) being requested by CPU 210. The request may be generated in response to a reference by CPU 210 to a memory location that is within the range of addresses encompassed by line "B." The method 700 determines whether line "B" is stored within the L1D cache 230 in block 720. For example, whether line "B" is stored within the L1D cache 230 can be determined by whether an association exists between a tag address 272 of line "B" and a line frame of L1D cache 230. When there is a cache hit in L1D cache 230, no prefetch buffer action is typically taken (block 730) and the method 700 may return to block 710 to handle a next line request.

When there is no cache hit in L1D cache 230, the method 700 determines whether line "B" is stored within the prefetch buffer 220 (block 740). For example, whether line "B" is stored within the prefetch buffer 220 can be determined by whether an association exists between a tag address of line "B" and the address field 520 of an entry in the prefetch buffer 220.

When there is a prefetch buffer hit, the method 700 at block 750 invokes function "get_loc(B)," which returns an index designating the entry in the prefetch buffer that is to be used to store line "B." (Function "get_loc(B)" may be implemented in hardware, for example, or by using a combination of hardware and software.) The method 700 at block 750 also transfers line "B" from the prefetch buffer 220 to the L1D cache 230 and sets a "p_bit" (e.g., a "prefetch bit") associated with a prefetch buffer entry for line "B" to "0" (for example), which indicates a line adjacent to line "B" has not (yet) been prefetched. Thus, a p_bit that is associated with each line is stored as an entry in the prefetch buffer 220 and may be used to indicate whether a reference of the line associated with the p_bit has already triggered a prefetch for an adjacent line. When there is no prefetch buffer hit (see block 740), the method 700 at block 760 transfers line "B" from L2 cache 240 to the L1D cache 230.

In block 770, the method 700 determines whether the succeeding line (B+1) exists in the L1D cache 230 or exists in the prefetch buffer 220. (A succeeding line may be a line that is adjacent to a requested line, and having a line address that is greater than the requested line.) If the succeeding line (B+1) exists in the L1D cache 230 or exists in the prefetch buffer 220, the method 700 waits (block 772) for another line request (after which the method 700 may return to block 710 to handle the next line request).

If the method 700 in block 770 determines that the succeeding line (B+1) does not exist in either the L1D cache 230 or in the prefetch buffer 220, the succeeding line may be accessed by prefetching the line from L2 cache 240. In block 774, the succeeding line (B+1) is prefetched, the p_bit of the line "B" is set (by using the index [i] returned by the "get_loc(B)" function to locate the entry corresponding to line "B"). Thus, the p_bit can be used by subsequences references to relatively quickly determine whether a reference of line "B" has already triggered a prefetch of the succeeding line (B+1). When the same line (e.g., line "B") is "hit" again, no prefetch is typically issued again (to prefetch the succeeding line), which reduces the accesses to L2 cache 240 (for example) because the p_bit associated with line "B" is set. Accordingly, various adverse patterns of memory accesses that would typically result in "useless" prefetching (such as cache memory "thrashing") may be substantially reduced and system performance may be substantially improved.

In typical operation, a previously stored entry within the prefetch buffer is evicted to allocate storage for the succeeding line (B+1). For example, an entry in the prefetch buffer 220 typically remains in the prefetch buffer 220 until evicted in accordance with the prefetch buffer 220 replacement policy. In block 774, the succeeding line (B+1) is prefetched (from the L2 cache 240, for example). An index [j] may also be determined by invoking a "get_replacement_index( )" function for storing the prefetched succeeding line (B+1) in the next available entry (e.g., at index [j]) in the prefetch buffer 220. The p_bit of entry [j] (e.g., an entry in the prefetch buffer 220 assigned to the succeeding line) is set to "0," the p_bit of entry [i] is set to "1" (because the succeeding line has been prefetched), the address field of entry [j] is set to an address that corresponds to the address of the succeeding line (B+1), and the data field of entry [j] is set to the data obtained in the prefetch of the succeeding line (from the L2 cache 240, for example).

Thus, when prefetching lines in a single direction (such as a forward direction), the method can perform the following operations. When the address of the line that is referenced (by the CPU 210, for example) is not tagged (and/or "hit") in either a higher-level cache (such as the L1D cache 230) or the prefetch buffer, the line is retrieved (from a lower-level cache such as the L2 cache 240) and stored locally (in the L1D cache 230, for example), and the line (such as the next succeeding line) next to the referenced line is retrieved (from the L2 cache 240, for example) and stored in the prefetch buffer cache 220. When the address of the line that is referenced (by the CPU 210, for example) is not tagged ("hit") in a higher-level cache (such as the L1D cache 230) but is tagged in the prefetch buffer 220, the line is retrieved from the prefetch buffer 220 and stored in the higher-level cache (in the L1D cache 230, for example), and the line (such as the next succeeding line) next to the referenced line is retrieved (from the L2 cache 240, for example) and stored in the prefetch buffer cache 220.

Figure 8:
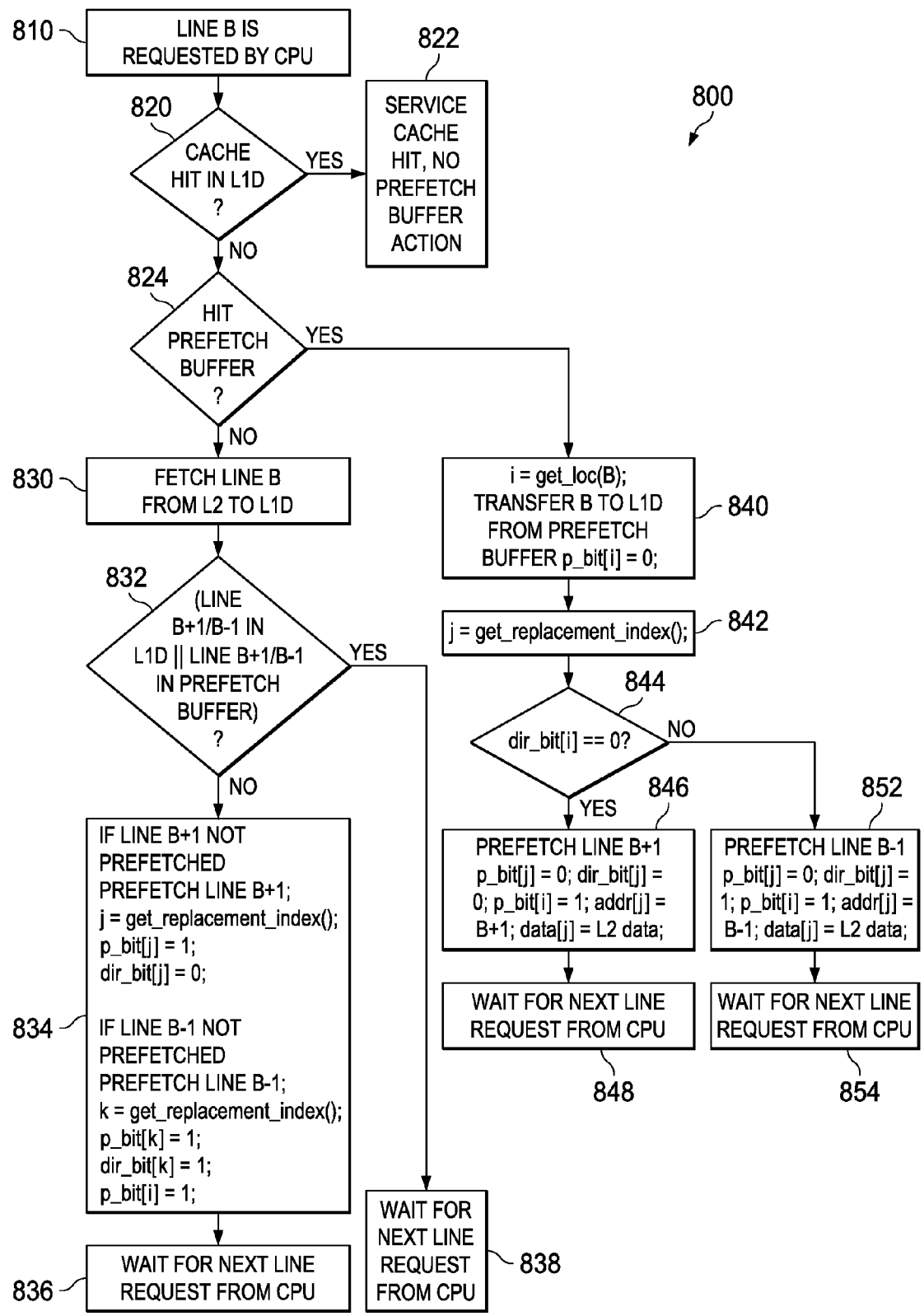
FIG. 8 is a flow diagram illustrating a method for controlled directionality prefetch buffering in accordance with embodiments of the disclosure.

FIG. 8 shows an illustrative method 800 for a bidirectional prefetch buffer that may be implemented in accordance with embodiments of the disclosure. In the illustrated embodiment, a "p_bit" is used to store an indication whether a line that is adjacent to a requested line has been prefetched. In some embodiments, a controlled directionality prefetch buffer fetches data in a "forward" direction and/or in a "backward" direction. In a forward direction, for example, a succeeding line that sequentially follows (and/or is adjacent to) a referenced line can be prefetched. In a backward direction, for example, a preceding line that is stored before (and/or is adjacent to) a referenced line can be prefetched. Instead of always prefetching succeeding line (i+1) when line "i" is hit, for example, the direction (ascending order or descending order) of an address prefetch sequence can be determined based on previous cache misses. The direction of the prefetching can be determined as explained in the discussion below.

The method 800 begins at block 810 with a line "B" being requested by CPU 210, for example. The method 800 determines whether line "B" is stored within the L1D cache 230 in block 820. For example, whether line "B" is stored within the L1D cache 230 can be determined by whether an association exists between a tag address 272 of line "B" and a line frame of L1D cache 230. When there is a cache hit in L1D cache 230, no prefetch buffer action is typically taken (block 822) and the method 800 may return to block 810 to handle a next line request.

When there is no cache hit in L1D cache 230, the method 800 determines whether line "B" is stored within the prefetch buffer 220 (block 824). For example, whether line "B" is stored within the prefetch buffer 220 can be determined by whether an association exists between a tag address of line "B" and the address field 520 of an entry in the prefetch buffer 220. When there is no prefetch buffer hit, the method 800 at block 830 transfers line "B" from L2 cache 240 to the L1D cache 230.

In block 832, the method 800 determines whether the succeeding line (B+1) and the preceding line (B−1) exist in the L1D cache 230 or exist in the prefetch buffer 220. When both the succeeding line (B+1) and the preceding line (B−1) exist in either the L1D cache 230 or exist in the prefetch buffer 220, the method 800 waits (block 838) for another line request (after which the method 800 may return to block 810 to handle the next line request).

If the method 800 in block 834 determines that the succeeding line (B+1) does not exist in the prefetch buffer 220, the succeeding line may be accessed by prefetching the line from L2 cache 240. Also, an index [j] may be determined by invoking a "get_replacement_index( )" function for storing and prefetching the succeeding line (B+1) in the next available entry in the prefetch buffer 220. Additionally, the p_bit of succeeding line (B+1) is set to "1" (by using the index [j] returned by the "get_loc(B)" function to locate the entry corresponding to line succeeding line (B+1)) and the dir_bit [j] (for determining whether to prefetch an adjacent line in a forward or a backward direction) is set to "0" (a forward direction, for example).

If the method 800 in block 834 determines that the preceding line (B−1) does not exist in the prefetch buffer 220, the preceding line may be accessed by prefetching the line from L2 cache 240. Also, an index [k] may be determined by invoking a "get_replacement_index( )" function for storing and prefetching the preceding line (B−1) in the next available entry in the prefetch buffer 220. Additionally, the p_bit of the line "B−1" is set to "1" (by using the index [k] returned by the "get_loc(B)" function to locate the entry corresponding to line "B") and the dir_bit[k] is set to "1," for example. After both the preceding line (B−1) and the succeeding line (B+1) have been prefetched, the p_bit of line "B" is set using the index "i," which indicates that bidirectional prefetching of the preceding and succeeding lines (of line "B") has been performed.

When there is a prefetch buffer hit (see block 824), the method 800 at block 840 invokes function "get_loc(B)," which returns an index designating the entry in the prefetch buffer in which line "B" is stored. The method 800 at block 840 also transfers line "B" from the prefetch buffer 220 to the L1D cache 230 and sets a "p_bit" (e.g., a "prefetch bit") associated with a prefetch buffer entry for line "B" to "0" (which, for example, may indicate that the entry at index "i" has been fetched from the prefetch buffer 220 to the L1D cache 230). In block 842, the method 800 determines an index [j] by invoking a "get_replacement_index( )" function for storing a prefetched succeeding line (B+1) or preceding line (B−1) in the next available entry ([j]) in the prefetch buffer 220.

If the dir_bit[i] (in block 844) indicates a forward direction, in block 846 the succeeding line (B+1) is prefetched (if not already prefetched). The prefetching includes moving data from the L2 cache 240 into a data field of a selected entry (indexed as "j" in this example) of the prefetch buffer 220 as well as moving an address associated with the prefetched memory line into an address field of the selected entry of the prefetch buffer 220. In addition to prefetching, p_bit[j] is set to "0" (e.g., no prefetch has occurred of a line adjacent in a forward direction to line B+1), dir_bit[j] is set to "0" (e.g., forward direction), and p_bit[i] is set to "1" (e.g., a prefetch of a line adjacent to line "B" has occurred). After the prefetch has occurred and the associated status bits set, the method waits (block 848) for another line request (after which the method 800 may return to block 810 to handle a next line request). Thus, the last previous prefetch direction is determined and stored as the direction of the next prefetch. The possibility of the direction of the next prefetch being correct is thus relatively high because data in memory is often stored sequentially and in close proximity to related data.

If the dir_bit[i] (in block 844) indicates a backward direction, in block 852 the preceding line (B−1) is prefetched (if not already prefetched). The prefetching includes moving data from the L2 cache 240 into a data field of a selected entry (indexed as "j" in this example) of the prefetch buffer 220 as well as moving an address associated with the prefetched memory line into an address field of the selected entry of the prefetch buffer 220. In addition to prefetching, p_bit[j] (of line B−1) is set to "0" (e.g., no prefetch has occurred of a line adjacent in a backward direction to line B+1), dir_bit[j] is set to "1" (e.g., backward direction), and p_bit[i] is set to "1" (e.g., a prefetch of a line adjacent to line "B" has occurred). After the prefetch has occurred and the associated status bits set, the method waits (block 854) for another line request (after which the method 800 may return to block 810 to handle the next line request).

Thus, when prefetching lines using controlled directionality by using a direction indicator (such as the dir_bit) to indicate a predicted direction, the method can perform the following operations. When the address of the line that is referenced (by the CPU 210, for example) is not tagged ("hit") in either a higher-level cache (such as the L1D cache 230) or the prefetch buffer, the line is retrieved (from a lower-level cache such as the L2 cache 240) and stored locally (in the L1D cache 230, for example), and the lines (such as the adjacent succeeding line and/or the preceding line) next to the referenced line may be retrieved (from the L2 cache 240, for example) and stored in the prefetch buffer cache 220. When the succeeding line is prefetched, the direction indicator for the line is set to a forward direction, and when the preceding line is prefetched, the direction indicator for the line is set to a backward direction.

When the address of the line that is referenced (by the CPU 210, for example) is not tagged ("hit") in a higher-level cache (such as the L1D cache 230) but is tagged in the prefetch buffer 220 and the direction bit is set to a forward direction, the line is retrieved from the prefetch buffer 220 and stored in the higher-level cache (in the L1D cache 230, for example). The next succeeding line is also retrieved (from the L2 cache 240, for example) and stored in the prefetch buffer cache 220 and the direction bit associated with the entry for the next succeeding line is set to a forward direction.

When the address of the line that is referenced (by the CPU 210, for example) is not tagged ("hit") in a higher-level cache (such as the L1D cache 230) but is tagged in the prefetch buffer 220 and the direction bit is set to a backward direction, the line is retrieved from the prefetch buffer 220 and stored in the higher-level cache (in the L1D cache 230, for example). The preceding line is also retrieved (from the L2 cache 240, for example) and stored in the prefetch buffer cache 220 and the direction bit associated with the entry for the next succeeding line is set to a backward direction.

When the prefetch buffer 220 and associated control is implemented outside of the L1D (for example), user-programmable prefetch control may be used when the data access pattern is known. The user-programmable prefetch control can be used to trigger prefetching using a software control prefetch algorithm. Software hints can be used to control hardware prefetch computations, and/or software can be used to directly seed the prefetch buffer. Accordingly, the address to be prefetched can be stored directly into a prefetch FIFO, thus triggering the prefetch. Storing the address directly into the prefetch FIFO can be accomplished (for example) through direct ISA support (prefetch instruction) or through writing directly to memory mapped control registers.

The eviction and allocation policies of the prefetch buffer 220 may be managed in different fashions such as by using a FIFO queue, a pseudo LRU replacement buffer, and hole-filling FIFO queue schemes. Because the prefetch buffer 220 is fully associative and a corresponding prefetch line will be transferred to L1D cache when there is a hit in the prefetch buffer, a replaceable entry is left. The FIFO replacement policy may shift each entry (that is behind the transferred entry) down in order to move the empty entry to the back of the queue. Thus the newly prefetched line can be placed at the back of the queue. The FIFO replacement scheme helps to ensure that earlier entries stay near the front of the queue to be removed when a new prefetch needs to replace the filled-up prefetch buffer 220. Pseudo LRU replacement scheme use a pseudo-LRU computation to determine which entry stayed in the buffer the longest time, which is then overwritten by the newly prefetched entry in the prefetch buffer 220. A hole-filling FIFO scheme typically does not shift entries when an entry is hit and transferred out of the prefetch buffer 220. When a newly prefetched entry is to be stored, the newly prefetched entry is typically stored in the empty entry first. When no empty space us available, a FIFO scheme may be used. The FIFO replacement scheme has been determined in various simulations to have the best hit rate in prefetch buffer, overall hit rate and performance overhead.

As discussed above, the disclosed techniques are applicable to any level of cache: L1, L2, L3, and the like. For example, prefetching can be performed by prefetching lines from an L3 cache and stored in a prefetch buffer and/or an L2 cache, where the prefetch buffer and the L2 cache are at the same level (L2) and are used to provide lines to an L1 cache.

The unidirectional prefetching and the controlled directionality prefetching addresses at least four aspects of the problems associated with prefetch techniques. First, cache pollution is minimized because the disclosed prefetching avoids polluting the cache with prefetching data that may not be used. Prefetched lines can be stored separately in a prefetch buffer by maintaining a relatively small list of prefetch addresses and data. Second, duplicate prefetch requests are avoided because memory is used to store whether a line has already been requested to be prefetched. Third, unused bidirectional prefetching is reduced by using controlled directionality prefetching. Forth, a reduction in cache line size is possible because of the increase in efficiency of the unidirectional prefetching and the controlled directionality prefetching.

Figure 9:
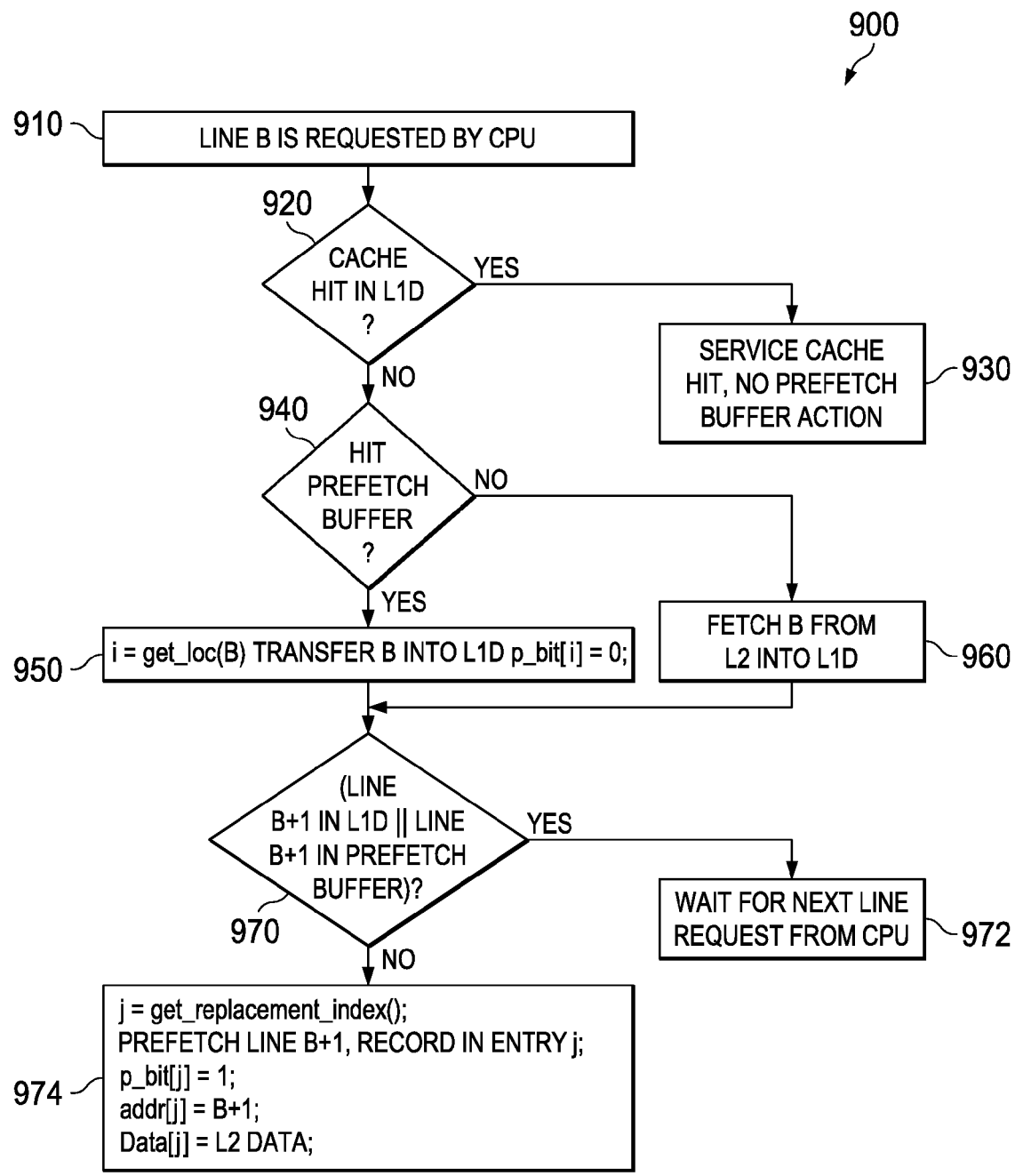
FIG. 9 is a flow diagram illustrating another method for unidirectional prefetch buffering in accordance with embodiments of the disclosure.

FIG. 9 shows an illustrative method 900 for a unidirectional prefetch buffer that may be implemented in accordance with embodiments of the disclosure. In the illustrated embodiment, a "p_bit" is used to store an indication whether a requested line (itself) has been prefetched. In some embodiments, the unidirectional prefetch buffer fetches data in a "forward" direction, such that (for example) a succeeding line that sequentially follows (and/or is adjacent to) a referenced line is prefetched. Other embodiments may include unidirectional prefetching in an opposite direction by which a preceding line is prefetched when a line that follows the preceding line is referenced.

The method 900 begins at block 910 with a line "B" being referenced by CPU 210, for example. The method 900 determines whether line "B" is stored within the L1D cache 230 in block 920. For example, whether line "B" is stored within the L1D cache 230 can be determined by whether an association exists between a tag address 272 of line "B" and a line frame of L1D cache 230. When there is a cache hit in L1D cache 230, no prefetch buffer action is typically taken (block 930) and the method 900 may return to block 910 to handle the next line request.

When there is no cache hit in L1D cache 230, the method 900 determines whether line "B" is stored within the prefetch buffer 220 (block 940). For example, whether line "B" is stored within the prefetch buffer 220 can be determined by whether an association exists between a tag address of line "B" and the address field 520 of an entry in the prefetch buffer 220.

When there is a prefetch buffer hit, the method 900 at block 950 invokes function "get_loc(B)," which returns an index designating the entry in the prefetch buffer that is to be used to store line "B." The method 900 at block 950 also transfers line "B" from the prefetch buffer 220 to the L1D cache 230 and sets a "p_bit" (e.g., a "prefetch bit") associated with a prefetch buffer entry for line "B" to "0." A p_bit is associated with each line stored as an entry in the prefetch buffer 220 and is used (for example) to indicate the line associated with the p_bit has been fetched from the prefetch buffer 220 to the L1 D cache 230. When there is no prefetch buffer hit (see block 940), the method 900 at block 960 transfers line "B" from L2 cache 240 to the L1D cache 230.

In block 970, the method 900 determines whether the succeeding line (B+1) exists in the L1D cache 230 or exists in the prefetch buffer 220. If the succeeding line (B+1) exists in the L1D cache 230 or exists in the prefetch buffer 220, the method 900 waits (block 972) for another line request (after which the method 900 may return to block 910 to handle the next line request).

If the method 900 in block 970 determines that the succeeding line (B+1) does not exist in either the L1D cache 230 or in the prefetch buffer 220, the succeeding line may be accessed by prefetching the line from L2 cache 240. In block 974, the succeeding line (B+1) is prefetched (from the L2 cache 240, for example) and an index [j] may be determined by invoking a "get_replacement_index( )" function for storing the prefetched succeeding line (B+1) in the next available entry (Up in the prefetch buffer 220. The p_bit of entry [j] (e.g., an entry in the prefetch buffer 220 assigned to the succeeding line) is set to "1" (because the succeeding line has been prefetched), the address field of entry [j] is set to an address that corresponds to the address of the succeeding line (B+1), and the data field of entry [j] is set to the data obtained in the prefetch of the succeeding line (from the L2 cache 240, for example).

Thus, when prefetching lines in a single direction (such as a forward direction), the method can perform the following operations. When the address of the line that is referenced (by the CPU 210, for example) is not tagged (and/or "hit") in either a higher-level cache (such as the L1D cache 230) or the prefetch buffer, the line is retrieved (from a lower-level cache such as the L2 cache 240) and stored locally (in the L1D cache 230, for example), and the line (such as the next succeeding line) next to the referenced line is retrieved (from the L2 cache 240, for example) and stored in the prefetch buffer cache 220. When the address of the line that is referenced (by the CPU 210, for example) is not tagged ("hit") in a higher-level cache (such as the L1D cache 230) but is tagged in the prefetch buffer 220, the line is retrieved from the prefetch buffer 220 and stored in the higher-level cache (in the L1D cache 230, for example), and the line (such as the next succeeding line) next to the referenced line is retrieved (from the L2 cache 240, for example) and stored in the prefetch buffer cache 220.

Figure 10:
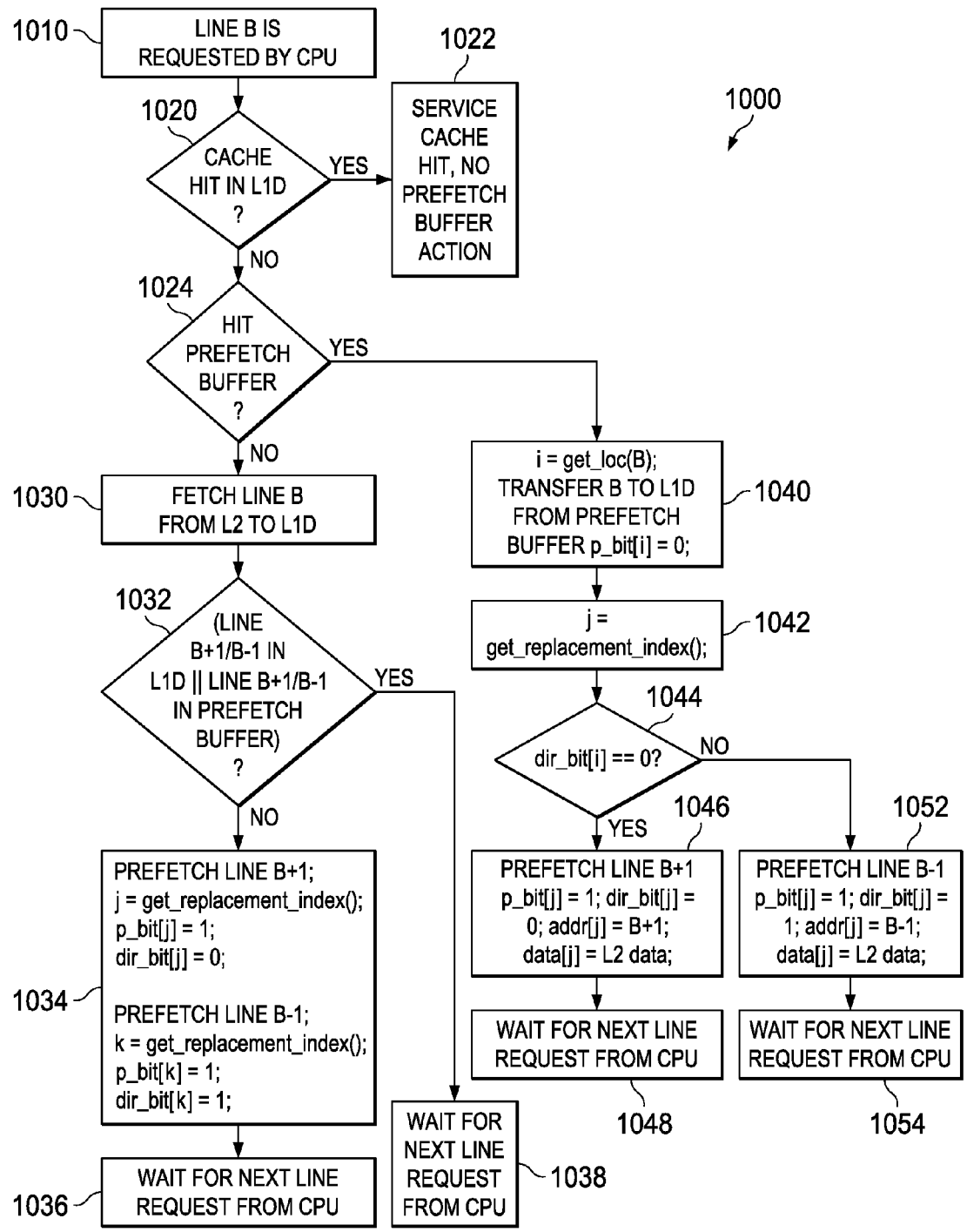
FIG. 10 is a flow diagram illustrating another method for controlled directionality prefetch buffering in accordance with embodiments of the disclosure.

FIG. 10 shows an illustrative method 1000 for a bidirectional prefetch buffer that may be implemented in accordance with embodiments of the disclosure. In the illustrated embodiment, a "p_bit" is used to store an indication whether a requested line (itself) has been prefetched. In some embodiments, the bidirectional prefetch buffer fetches data in a "forward" direction and/or in a "backward" direction. In a forward direction, for example, a succeeding line that sequentially follows (and/or is contiguous with) a referenced line can be prefetched. In a backward direction, for example, a preceding line that is stored before (and/or is contiguous with) a referenced line can be prefetched. Instead of always prefetching succeeding line (i+1) when line "i" is hit, for example, the direction (ascending order or descending order) of an address access sequence can be determined based on previous cache misses. The direction of the prefetching can be determined as explained in the discussion below.

The method 1000 begins at block 1010 with a line "B" being requested by CPU 210, for example. The method 1000 determines whether line "B" is stored within the L1D cache 230 in block 1020. For example, whether line "B" is stored within the L1D cache 230 can be determined by whether an association exists between a tag address 272 of line "B" and a line frame of L1D cache 230. When there is a cache hit in L1D cache 230, no prefetch buffer action is typically taken (block 1022).

When there is no cache hit in L1D cache 230, the method 1000 determines whether line "B" is stored within the prefetch buffer 220 (block 1024). For example, whether line "B" is stored within the prefetch buffer 220 can be determined by whether an association exists between a tag address 520 of line "B" and an entry in the prefetch buffer 220.

When there is no prefetch buffer hit, the method 1000 at block 1030 transfers line "B" from L2 cache 240 to the L1D cache 230. In block 1032, the method 1000 determines whether both the succeeding line (B+1) and the preceding line (B−1) exist in the L1D cache 230 or exist in the prefetch buffer 220. When both the succeeding line (B+1) and the preceding line (B−1) exist in either the L1D cache 230 or exist in the prefetch buffer 220, the method 1000 waits (block 1038) for another line request (after which the method 1000 may return to block 1010 to handle the next line request).

If the method 1000 in block 1034 determines that the succeeding line (B+1) does not exist in the prefetch buffer 220, the succeeding line may be accessed by prefetching the line from L2 cache 240. Also, an index [j] may be determined by invoking a "get_replacement_index( )" function for storing and prefetching the succeeding line (B+1) in the next available entry in the prefetch buffer 220. Additionally, the p_bit of succeeding line (B+1) is set (by using the index [j] returned by the "get_loc(B)" function to locate the entry corresponding to line succeeding line (B+1)) and the dir_bit [j] (for determining whether to prefetch in a forward or a backward direction) is set to "0," meaning (for example) in a forward direction.

If the method 1000 in block 1034 determines that the preceding line (B−1) does not exist in the prefetch buffer 220, the preceding line may be accessed by prefetching the line from L2 cache 240. Also, an index [k] may be determined by invoking a "get_replacement_index( )" function for storing and prefetching the preceding line (B−1) in the next available entry in the prefetch buffer 220. Additionally, the p_bit of the line "B−1" is set (by using the index [k] returned by the "get_loc(B)" function to locate the entry corresponding to line "B") and the dir_bit[k] is set to "1," meaning (for example) in a backward direction. The method 1000 waits (block 1036) for another line request (after which the method 1000 may return to block 1010 to handle the next line request).

When there is a prefetch buffer hit (see block 1024), the method 1000 at block 1040 invokes function "get_loc(B)," which returns an index designating the entry in the prefetch buffer that has been used to store line "B." The method 1000 at block 1040 also transfers line "B" from the prefetch buffer 220 to the L1D cache 230 and sets a "p_bit" (e.g., a "prefetch bit") associated with a prefetch buffer entry for line "B" to "0" (which, for example, may indicate that the entry at index "i"

has been fetched from the prefetch buffer 220 to the L1D cache 230). In block 1042, the method 1000 determines an index [j] by invoking a "get replacement index( )" function for storing a prefetched succeeding line (B+1) or preceding line (B−1) in the next available entry ([j]) in the prefetch buffer 220.

If the dir_bit[i] (in block 1044) indicates a forward direction, in block 1046 the succeeding line (B+1) is prefetched (e.g., if not already prefetched). The prefetching includes moving data from the L2 cache 240 into a data field of a selected entry (indexed as "j" in this example) of the prefetch buffer 220 as well as moving an address associated with the prefetched memory line into an address field of the selected entry of the prefetch buffer 220. In addition to prefetching, the p_bit[j] is set to "1" (e.g., a prefetch has occurred of line B+1) and the dir_bit[j] is set to "0" (e.g., forward direction). After the prefetch has occurred and the associated status bits set, the method waits (block 1048) for another line request (after which the method 1000 may return to block 1010 to handle the next line request). Thus, the last previous prefetch direction is recorded and used as the direction of the next prefetch. The possibility of the direction of the next prefetch being correct is thus relatively high because data in memory is often stored sequentially and in close proximity to related data.

If the dir_bit[i] (in block 1044) indicates a backward direction, in block 1052 the preceding line (B−1) is prefetched (e.g., if not already prefetched). The prefetching includes moving data from the L2 cache 240 into a data field of a selected entry (indexed as "j" in this example) of the prefetch buffer 220 as well as moving an address associated with the prefetched memory line into an address field of the selected entry of the prefetch buffer 220. In addition to prefetching, the p_bit[j] (of line B−1) is set to "1" (e.g., a prefetch of the preceding line has occurred) and the dir_bit[j] is set to "1" (e.g., backward direction). After the prefetch has occurred and the associated status bits set, the method waits (block 1054) for another line request (after which the method 1000 may return to block 1010 to handle the next line request).

Thus, when prefetching lines using controlled directionality by using a direction indicator (such as the dir_bit) to indicate a predicted direction, the method can perform the following operations. When the address of the line that is referenced (by the CPU 210, for example) is not tagged ("hit") in either a higher-level cache (such as the L1D cache 230) or the prefetch buffer, the line is retrieved (from a lower-level cache such as the L2 cache 240) and stored locally (in the L1D cache 230, for example), and the lines (such as the adjacent succeeding line and/or the preceding line) next to the referenced line may be retrieved (from the L2 cache 240, for example) and stored in the prefetch buffer cache 220. When the succeeding line is prefetched, the direction indicator for the line is set to a forward direction, and when the preceding line is prefetched, the direction indicator for the line is set to a backward direction.

As discussed above, the disclosed techniques are applicable to any level of cache: L1, L2, L3, and the like. For example, prefetching can be performed by prefetching lines from an L3 cache and stored in a prefetch buffer and/or an L2 cache, where the prefetch buffer and the L2 cache are used to provide lines to an L1 cache.

Figure 11:
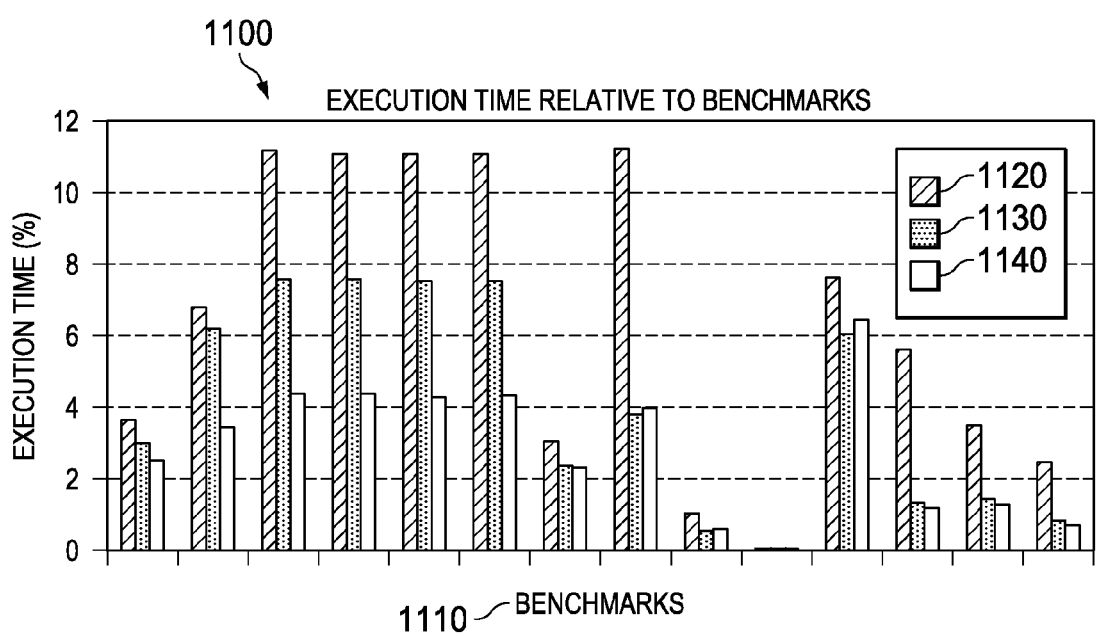
FIG. 11 is a chart illustrating comparative benchmark performance in simulations in accordance with embodiments of the disclosure.

FIG. 11 illustrates a performance chart comparing execution times of various benchmarks using no prefetching, unidirectional prefetching, and controlled directionality prefetching. To measure the performance of the cache system, a few parameters are defined. The "Cache Miss Rate" can be defined as the number of "Cache Misses" divided by the number of "Total Memory Accesses:"

Cache Miss Rate=Cache Misses/Total Memory Accesses

The "Performance Penalty" can be defined as the quantity of "Cache Misses" times the "Cache Miss Penalty" plus the "Prefetch Hits" times the "Prefetch Cycle Time," the quantity divided by the number of Total Execution Cycles:

$$\text{Performance Penalty} = \frac{\text{Cache Misses} * \text{Cache Miss Penalty} + \text{Prefetch Hits} * \text{Prefetch Cycle Time}}{(\text{Total Execution Cycles})}$$

In chart 1100, the disclosed unidirectional prefetching 1130, and controlled directionality prefetching 1140 schemes demonstrate a reduction in execution time (over no prefetching 1120) for various benchmarks 1110. Most of the simulated benchmarks 1110 show further hit rate and performance improvement by the controlled directionality prefetching 1140 scheme over the unidirectional prefetching 1130 scheme. In a detailed cycle-by-cycle trace-driven simulation using a c6x-architecture model across the various benchmarks, the simulated system tended to reference data memory in mostly unidirectional for small intervals of time (as compare to most often changing direction, for example). Thus, the simulated system tended to accesses consecutive memory locations in both ascending and descending orders alternatively. Accordingly, the controlled directionality prefetching 1140 scheme mostly outperformed the disclosed unidirectional prefetching 1130 scheme (as well as significantly outperforming the no prefetching 1120 scheme) in virtually all of the benchmarks 1110 illustrated in the chart 1100.

The simulations disclosed prefetching schemes demonstrate that the cache performance overhead may be reduced by as much as 40 percent as compared to a base-line cache system without prefetching. The simulation using controlled directionality prefetching showed an additional 15% performance overhead reduction over a unidirectional prefetch scheme, and a 75% performance overhead reduction over the base-line cache system. The additional power and the additional L2 memory accesses (used to implement the unidirectional prefetching 1130 and controlled directionality prefetching operations 1140) were found to be relatively small (with respect to the speed gains and memory accesses avoided in accordance with the present disclosure.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this disclosure as subsequently claimed herein.

What is claimed is:

1. A method for prefetching memory in caching systems, comprising:
   receiving a request for a memory line having an associated address;
   in response to a request for a memory line determining whether the memory line is stored in a prefetch buffer, the prefetch buffer having a plurality of prefetch buffer entries, each prefetch buffer entry including a data field for storing a corresponding memory line, an address field for storing an address corresponding to the memory line and an prefetch indicator field for storing an indication whether a memory line next adjacent to the corresponding memory line is stored in the prefetch buffer;
if the requested memory line is stored in the prefetch buffer supplying the requested memory line from the prefetch buffer;
if the requested memory line is not stored in the prefetch buffer
  requesting the requested memory line from a next level memory, and
  supplying the requested memory line;
following supply of the requested memory line, accessing the prefetch indicator field of the prefetch entry allocated to the requested memory line to determine whether the next adjacent memory line has been prefetched; and
in response to a determination of the accessed prefetch indicator field that indicates the next adjacent memory has not been prefetched
  prefetching the next adjacent memory line from the next level memory,
  allocating a prefetch buffer entry to the next adjacent memory line, and
  storing the prefetched next adjacent memory line in the allocated prefetch buffer entry by storing in the data field the prefetched next adjacent memory line, storing in the address field the associated address and storing in the prefetch indicator field an indication that the memory line next adjacent to the corresponding memory line is not stored in the prefetch buffer, and
  storing an indication in the prefetch indicator field of the prefetch buffer entry associated with the requested memory line that the next adjacent memory line has been prefetched.

2. The method of claim 1, further comprising: storing the prefetched memory line in a prefetch buffer that is external to a set-associative cache.

3. The method of claim 2, wherein the prefetch buffer is fully associative.

4. The method of claim 1, wherein the accessing a prefetch indicator associated with the requested memory line to determine whether the next adjacent memory line has been prefetched is performed in response to a determination that the requested memory line is not stored in a cache of a first level.

5. The method of claim 1, wherein in the associated memory address of the next adjacent line is greater than the associated memory address of the requested line.

6. A system for prefetching memory in caching systems, comprising:
  a processor that is configured to generate requests for data, wherein each request for data has an associated address that is included within at least one memory line;
  a cache of a first level configured to store memory lines from a lower level memory, wherein each memory line is associated with at least one memory address of a request for data;
  a prefetch buffer having a plurality of prefetch buffer entries, each prefetch buffer entry including a data field for storing a memory line, an address field for storing an address corresponding to the memory line and an indicator field for storing an indication whether a memory line next adjacent to the corresponding memory line is stored in the prefetch buffer, said prefetch buffer configured to prefetch a next adjacent memory line from the lower level memory in response to the request for data wherein the next adjacent memory line is a memory line that is adjacent to a requested memory line if the prefetch indicator field of the prefetch entry corresponding to the requested memory line indicates the next adjacent memory line has not been prefetched, to store an indication in the prefetch indicator field of the prefetch entry corresponding to the requested that a memory line that the next adjacent memory line has been prefetched; and to transfer a prefetched memory line to the cache of the first level in response to the stored indication that a memory line associated with an address associated with the requested data has been prefetched.

7. A method for prefetching memory in caching systems, comprising:
  receiving a request from a central processing unit for a memory line having an associated address;
  determining whether the requested memory line is stored in a data cache;
  if the requested memory line is stored in the data cache, supplying the requested memory line to the central processing unit from the data cache;
  if the requested memory line is not stored in the data cache, determining whether the requested memory line is stored in a prefetch buffer, the prefetch buffer having a plurality of prefetch buffer entries, each prefetch buffer entry including a data field for storing a corresponding memory line, an address field for storing an address corresponding to the memory line and an prefetch indicator field for storing an indication whether a memory line next adjacent to the corresponding memory line is stored in the prefetch buffer
    if the requested memory line is stored in the prefetch buffer, copying the requested memory line from the prefetch buffer into the cache and supplying the requested memory line to the central processing unit, and
    if the requested memory line is not stored in the prefetch buffer, recalling the requested memory line from a lower level memory, storing the requested memory line from the lower level memory into the cache and supplying the requested memory line to the central processing unit;
  if the requested memory line was not stored in the data cache and following supply of the requested memory line to the central processing unit
    determining whether a next adjacent memory line to the requested memory line has been prefetched by accessing the prefetch indicator field of an entry in the prefetch buffer corresponding to the requested memory line, and
    if the next adjacent memory has not been prefetched prefetching the next adjacent memory line from the next level memory,
      storing the prefetched next adjacent memory line in the prefetch buffer, and
      storing an indication in the prefetch indicator field associated with the requested memory line that the next adjacent memory line has been prefetched.

8. The method of claim 7, further comprising:
  replacing entries within the cache according to a least recently used technique on a plurality of set associative ways; and
  replacing entries within the prefetch buffer according to a first-in-first-out technique in a fully associative manner.

* * * * *